(12) United States Patent
Sobue

(10) Patent No.: US 10,537,852 B2
(45) Date of Patent: Jan. 21, 2020

(54) EXHAUST-GAS-PURIFYING SYSTEM OF INTERNAL COMBUSTION ENGINE, METHOD OF USING EXHAUST-GAS-PURIFYING CATALYST AND METHOD OF CONTROLLING AIR-FUEL RATIO

(71) Applicant: TOYOTA JIDOSHA KABUSHIKI KAISHA, Toyota-shi, Aichi-ken (JP)

(72) Inventor: Yuichi Sobue, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 98 days.

(21) Appl. No.: 15/850,867

(22) Filed: Dec. 21, 2017

(65) Prior Publication Data

US 2018/0178165 A1 Jun. 28, 2018

(30) Foreign Application Priority Data

Dec. 28, 2016 (JP) .................................. 2016-255862

(51) Int. Cl.
| | |
|---|---|
| *F02D 41/02* | (2006.01) |
| *B01D 53/94* | (2006.01) |
| *B01J 23/00* | (2006.01) |
| *B01J 35/00* | (2006.01) |
| *B01J 37/02* | (2006.01) |

(52) U.S. Cl.
CPC .......... *B01D 53/945* (2013.01); *B01J 23/002* (2013.01); *B01J 35/0006* (2013.01); *B01J 37/0207* (2013.01); *B01J 37/0244* (2013.01); *B01D 2255/102* (2013.01); *B01D 2255/908* (2013.01)

(58) Field of Classification Search
CPC ............ B01D 53/945; B01D 2255/102; B01D 2255/908; B01J 35/0006; B01J 23/002
USPC .............................................. 422/168; 60/274
See application file for complete search history.

(56) References Cited

U.S. PATENT DOCUMENTS

| | | | |
|---|---|---|---|
| 6,514,905 B1 * | 2/2003 | Hanaki ................ | B01D 53/945 502/328 |
| 7,707,821 B1 | 5/2010 | Legare | |
| | | (Continued) | |

FOREIGN PATENT DOCUMENTS

| | | |
|---|---|---|
| JP | 2009028593 A | 2/2009 |
| JP | 2013-136032 A | 7/2013 |
| WO | 2017/153048 A1 | 9/2017 |

*Primary Examiner* — Tom P Duong
(74) *Attorney, Agent, or Firm* — Sughrue Mion, PLLC

(57) ABSTRACT

An exhaust-gas-purifying system of an internal combustion engine of the present disclosure sets a reduction treatment necessity flag to ON when an input gas temperature of an exhaust gas introduced into an exhaust-gas-purifying catalyst is higher than a reference temperature. Then, it is determined whether reduction treatment execution conditions in which the reduction treatment necessity flag has been set to ON and the input gas temperature has decreased and falls within a preset temperature range up to a reference temperature or lower are satisfied. Then, when it is determined that reduction treatment execution conditions are satisfied, a reduction treatment in which an air-fuel ratio of an intake gas supplied into the engine is adjusted to be richer than a stoichiometric air-fuel ratio is performed, and the reduction treatment necessity flag is set to OFF.

5 Claims, 9 Drawing Sheets

(56) References Cited

U.S. PATENT DOCUMENTS

| | | | | |
|---|---|---|---|---|
| 2011/0035136 A1* | 2/2011 | Niimi | ............... | B60K 6/445 |
| | | | | 701/110 |
| 2012/0085084 A1* | 4/2012 | Bisaiji | ............... | F01N 11/007 |
| | | | | 60/276 |
| 2013/0310248 A1* | 11/2013 | Aoki | ............... | B01D 53/945 |
| | | | | 502/303 |
| 2014/0033687 A1* | 2/2014 | Nakayama | ......... | F02D 19/105 |
| | | | | 60/287 |
| 2014/0294678 A1* | 10/2014 | Takano | ............ | F02D 41/0295 |
| | | | | 422/111 |
| 2014/0357480 A1 | 12/2014 | Aoki | | |

\* cited by examiner

EXHAUST-GAS-PURIFYING SYSTEM OF INTERNAL COMBUSTION ENGINE, METHOD OF USING EXHAUST-GAS-PURIFYING CATALYST AND METHOD OF CONTROLLING AIR-FUEL RATIO

INCORPORATION BY REFERENCE

The disclosure of Japanese Patent Application No. 2016-255862 filed on Dec. 28, 2016 including the specification, drawings and abstract is incorporated herein by reference in its entirety.

BACKGROUND

1. Technical Field

The present disclosure relates to an exhaust-gas-purifying system configured to purify an exhaust gas discharged from an internal combustion engine, a method of using an exhaust-gas-purifying catalyst and a method of controlling an air-fuel ratio.

2. Description of Related Art

For example, exhaust gas components such as HC, CO, and NOx are contained in exhaust gas discharged from an internal combustion engine such as a vehicle engine. In order to purify such exhaust gas components, an exhaust-gas-purifying catalyst is attached at a position along a passage of an exhaust pipe. In Japanese Unexamined Patent Application Publication No. 2013-136032 (JP 2013-136032 A), a technology for an exhaust-gas-purifying catalyst as a noble metal catalyst in which Rh and Pd are supported on an OSC material containing $CeO_2$ as a support is described.

SUMMARY

When the temperature of an exhaust gas to be introduced is low, an exhaust-gas-purifying catalyst has an oxidation activity for HC and CO that is insufficient in a lean atmosphere (in an excess-oxygen atmosphere). The technology in JP 2013-136032 A is used for purification at a stoichiometric air-fuel ratio of a gasoline engine and the purifying performance in low temperature lean conditions is low.

The present disclosure provides an exhaust-gas-purifying system configured to improve activity at low temperatures for purifying performance through oxidation with an exhaust-gas-purifying catalyst, a method of using an exhaust-gas-purifying catalyst and a method of controlling an air-fuel ratio.

A first aspect of the present disclosure relates to an exhaust-gas-purifying system of an internal combustion engine using an exhaust-gas-purifying catalyst in which at least one of Rh, Pd, and Pt is supported on a $CeO_2$-containing support, which includes a flag ON setting unit configured to set a reduction treatment necessity flag to ON when an input gas temperature which is a temperature of an exhaust gas introduced into the exhaust-gas-purifying catalyst is higher than a reference temperature; a conditions satisfying determination unit configured to determine whether reduction treatment execution conditions in which the reduction treatment necessity flag has been set to ON by the flag ON setting unit and the input gas temperature has decreased and falls within a preset temperature range up to the reference temperature or lower are satisfied; a reduction treatment performing unit configured to perform a reduction treatment in which an air-fuel ratio of an intake gas supplied to the internal combustion engine is adjusted to be richer than a stoichiometric air-fuel ratio when the conditions satisfying determination unit determines that the reduction treatment execution conditions are satisfied; and a flag OFF setting unit configured to set the reduction treatment necessity flag to OFF when the reduction treatment is performed by the reduction treatment performing unit.

In addition, a second of the present disclosure relates to a method of using an exhaust-gas-purifying catalyst in which at least one of Rh, Pd, and Pt is supported on a $CeO_2$-containing support, which includes a process of setting a reduction treatment necessity flag to ON when an input gas temperature which is a temperature of an exhaust gas introduced into the exhaust-gas-purifying catalyst is higher than a reference temperature, a process of performing a reduction treatment in which an air-fuel ratio of an intake gas supplied to the internal combustion engine is adjusted to be richer than a stoichiometric air-fuel ratio when the reduction treatment necessity flag is ON and the input gas temperature decreases and falls within a preset temperature range up to the reference temperature or lower, and a process of setting the reduction treatment necessity flag to OFF after the reduction treatment is performed.

A third aspect of the present disclosure relates to a method of controlling an air-fuel ratio in an exhaust-gas-purifying system of an internal combustion engine including an exhaust-gas-purifying catalyst in which at least one of Rh, Pd, and Pt is supported on a $CeO_2$-containing support. The method includes setting a reduction treatment necessity flag to ON when an input gas temperature which is a temperature of an exhaust gas introduced into the exhaust-gas-purifying catalyst is higher than a reference temperature; performing a reduction treatment in which an air-fuel ratio of an intake gas supplied to an internal combustion engine is adjusted to be richer than a stoichiometric air-fuel ratio when the reduction treatment necessity flag is set to ON and the input gas temperature decreases and falls within a preset temperature range up to the reference temperature or lower; and setting the reduction treatment necessity flag to OFF after the reduction treatment is performed.

A fourth aspect of the present disclosure relates to an exhaust-gas-purifying system of an internal combustion engine. The system includes an exhaust-gas-purifying catalyst having a configuration in which at least one of Rh, Pd, and Pt is supported on a $CeO_2$-containing support; and an electronic control unit. The electronic control unit is programed to set a reduction treatment necessity flag to ON when an input gas temperature which is a temperature of an exhaust gas introduced into the exhaust-gas-purifying catalyst is higher than a reference temperature; determine whether reduction treatment execution conditions in which the reduction treatment necessity flag has been set to ON and the input gas temperature has decreased and falls within a preset temperature range up to the reference temperature or lower are satisfied; perform a reduction treatment in which an air-fuel ratio of an intake gas supplied to the internal combustion engine is adjusted to be richer than a stoichiometric air-fuel ratio when it is determined that the reduction treatment execution conditions are satisfied; and set the reduction treatment necessity flag to OFF when the reduction treatment is performed.

According to the present disclosure, compared to a case in which no reduction treatment is performed, it is possible to improve oxidation activity of an exhaust-gas-purifying catalyst in a temperature state in which an input gas temperature is equal to or lower than a reference temperature.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
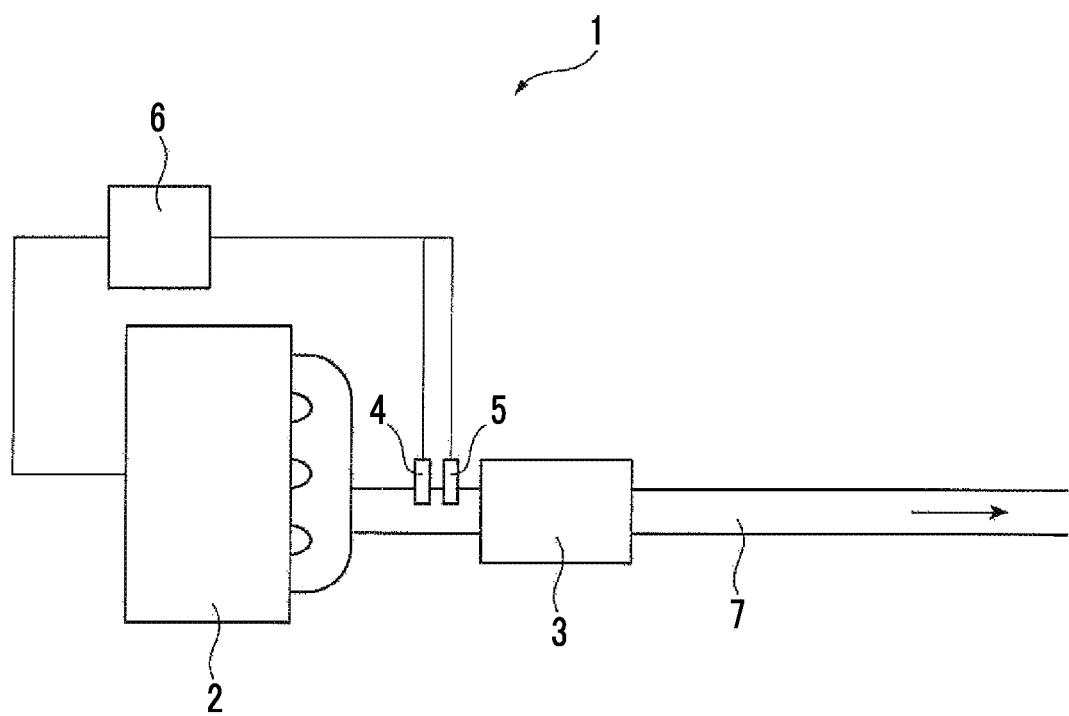
FIG. 1 is a conceptual diagram of an exhaust-gas-purifying system of an internal combustion engine.

Next, embodiments of the present disclosure will be described. FIG. 1 is a conceptual diagram of an exhaust-gas-purifying system of an internal combustion engine. An exhaust-gas-purifying system 1 in an internal combustion engine in the present embodiment is mounted in a vehicle and purifies an exhaust gas discharged from an engine 2 which is an internal combustion engine. The exhaust-gas-purifying system 1 includes the engine 2, an exhaust-gas-purifying catalyst 3, an input gas temperature sensor 4, an A/F sensor 5, and an ECU 6.

As the engine 2, a lean-burn engine or a diesel engine can be used. The exhaust-gas-purifying catalyst 3 is attached at a position along an exhaust pipe 7. The input gas temperature sensor 4 configured to measure an input gas temperature $T_{IN}$ which is a temperature of an exhaust gas introduced into the exhaust-gas-purifying catalyst 3 and the A/F sensor 5 configured to measure an air-fuel (A/F) ratio of the exhaust gas introduced into the exhaust-gas-purifying catalyst 3 are attached at positions between the engine 2 of the exhaust pipe 7 and the exhaust-gas-purifying catalyst 3.

The ECU 6 controls an air-fuel ratio of an intake gas sucked into the engine 2 using detection signals of the input gas temperature sensor 4 and the A/F sensor 5. The air-fuel ratio is controlled such that it is, for example, on an excess-oxygen lean side or an excess-fuel rich side with respect to the stoichiometric air-fuel ratio. Here, the A/F may be determined using an $O_2$ sensor instead of the A/F sensor 5, or the A/F may be calculated using an intake air amount and a fuel injection amount without the A/F sensor 5.

The exhaust-gas-purifying catalyst 3 is a catalyst having an oxidation function such as a three-way catalyst and an oxidation catalyst and has a configuration in which platinum group metals (PGM) are supported on a $CeO_2$-containing support. PGM include at least one of Rh, Pd, and Pt. For example, the exhaust-gas-purifying catalyst 3 may include a substrate and a catalyst coating layer formed on a surface of the substrate. The catalyst coating layer is formed in an upper and lower layer laminated structure including a lower layer that is closer to the surface of the substrate and an upper layer that is relatively far from the surface of the substrate. The catalyst coating layer includes Rh and Pd as a noble metal catalyst and includes an OSC material having an oxygen storage capacity as a support. Rh is disposed on the upper layer of the catalyst coating layer and Pd is disposed on both the upper layer and the lower layer of the catalyst coating layer. On the upper layer and the lower layer, at least a part of Pd is supported on the OSC material.

Figure 2:
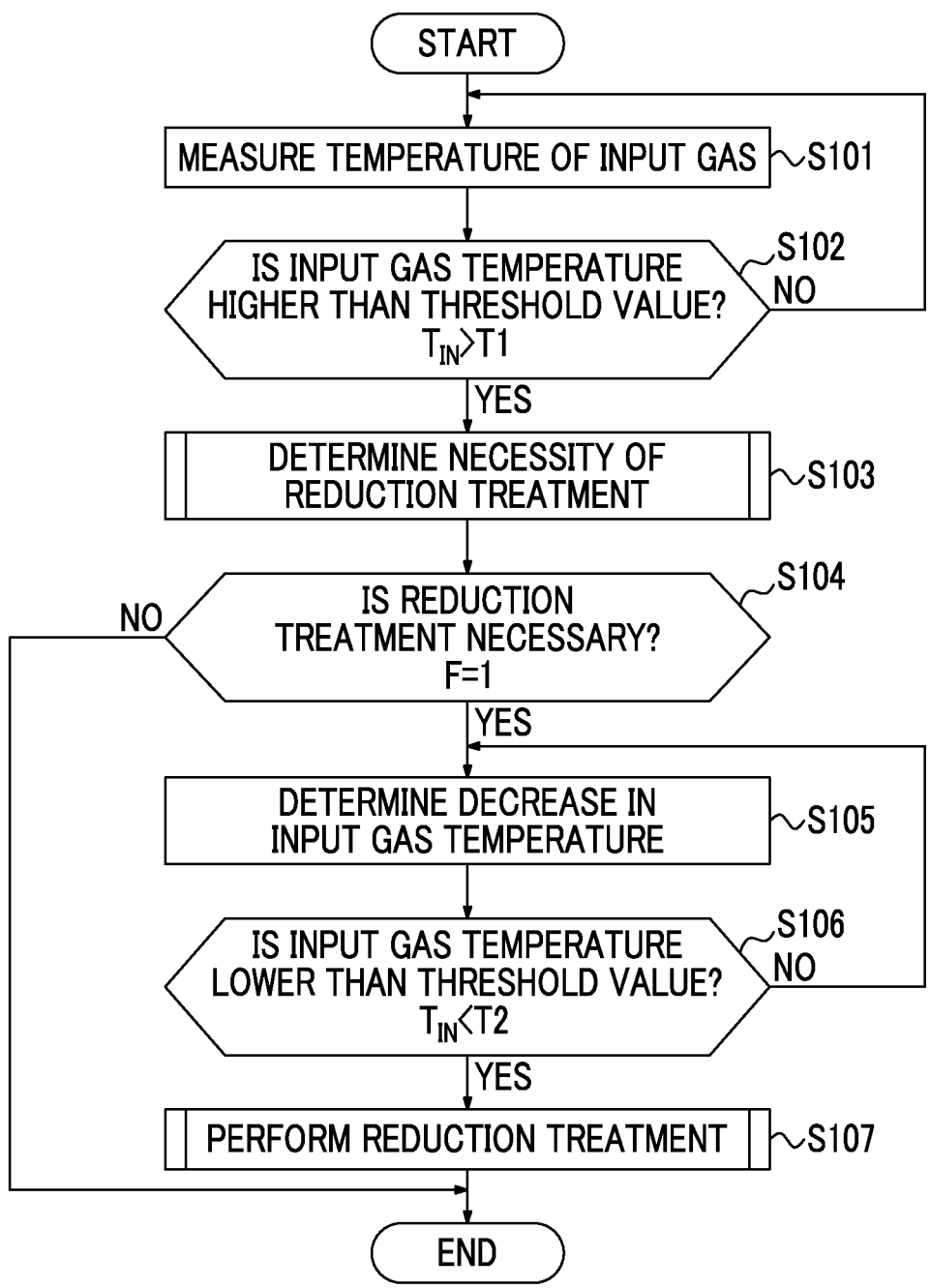
FIG. 2 is a control flowchart describing a method of using an exhaust-gas-purifying catalyst.
Figure 3:
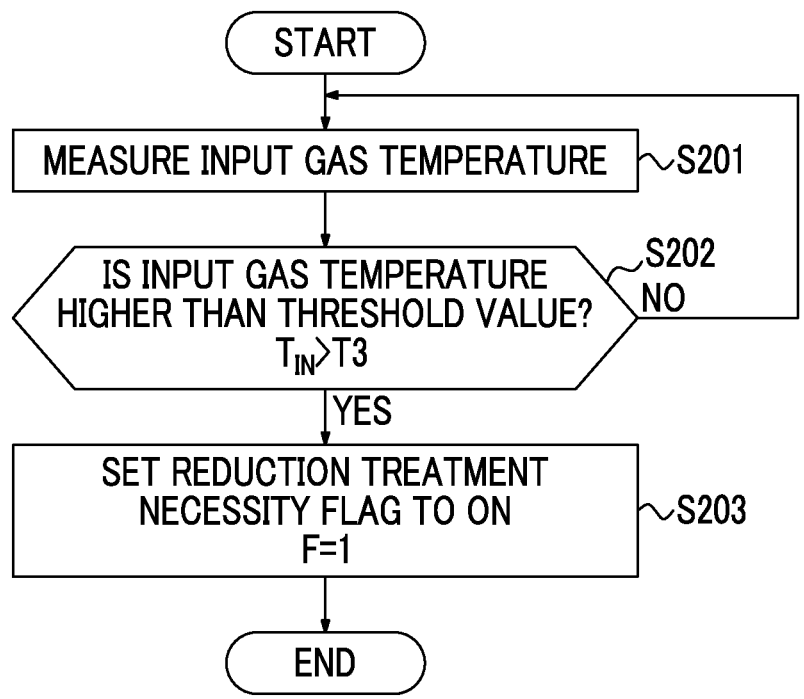
FIG. 3 is a flowchart describing a method of determining a necessity of a reduction treatment.
Figure 4:
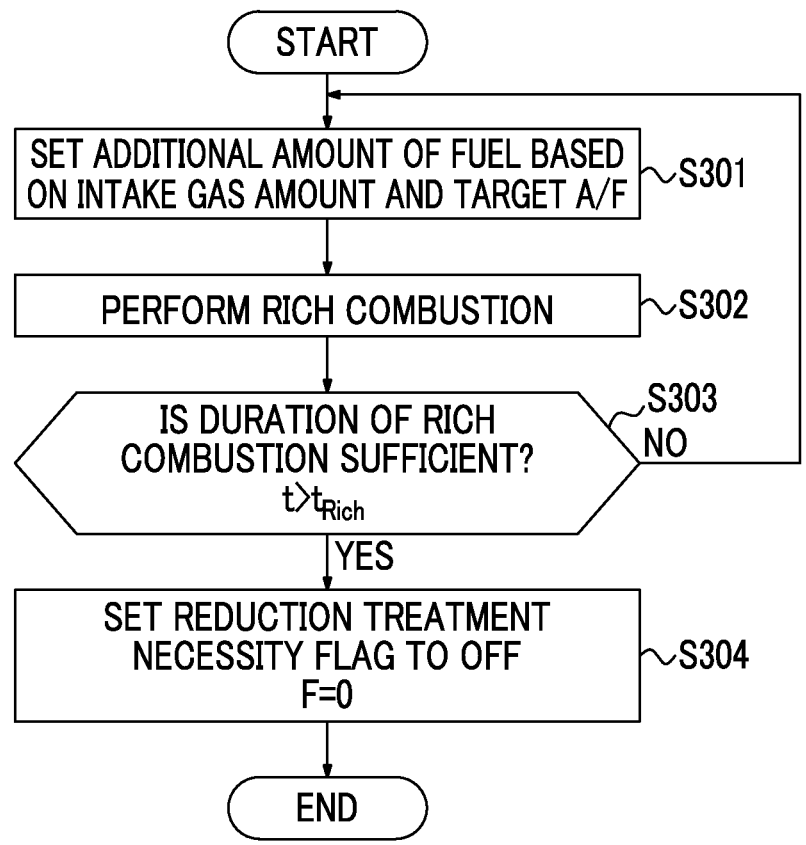
FIG. 4 is a flowchart describing details of a reduction treatment.

Next, an exhaust gas purifying method using the exhaust-gas-purifying catalyst 3 of the exhaust-gas-purifying system 1 will be described. FIG. 2 is a control flowchart describing a method of using an exhaust-gas-purifying catalyst. FIG. 3 is a flowchart describing a method of determining a necessity of a reduction treatment. FIG. 4 is a flowchart describing details of a reduction treatment.

In the exhaust gas purifying method in the present embodiment, when the input gas temperature $T_{IN}$ decreases from a temperature higher than a reference temperature T3 at which a necessity of a reduction treatment is determined and falls within a preset temperature range up to the reference temperature T3 or lower, a reduction treatment is performed only for a predetermined time for the exhaust-gas-purifying catalyst 3. When the reduction treatment is performed, oxidation activity of the exhaust-gas-purifying catalyst 3 in a temperature state in which the input gas temperature $T_{IN}$ is equal to or lower than the reference temperature T3 is improved, and low temperature activation is achieved. Thus, for example, if a reduction treatment is performed when the input gas temperature $T_{IN}$ during running decreases, it is possible to facilitate activity when the temperature is next raised, and it is possible to obtain high purifying performance with a small amount of PGM.

In the present method, first, the input gas temperature $T_{IN}$ of an exhaust gas introduced into the exhaust-gas-purifying catalyst 3 is measured (S101), and it is determined whether the input gas temperature $T_{IN}$ is higher than a lower limit temperature T1 ($T_{IN}$>T1) (S102). The lower limit temperature T1 is a threshold value preset as a temperature of a lower limit at which a reduction effect is obtained when a reduction treatment is performed. When the input gas temperature $T_{IN}$ is equal to or lower than the lower limit temperature T1 (NO in S102), since the reduction effect (an effect of low temperature activation of the exhaust-gas-purifying catalyst 3) is not obtained, no reduction treatment is performed.

On the other hand, when the input gas temperature $T_{IN}$ is higher than the lower limit temperature T1 (YES in S102), a process of determining a necessity of a reduction treatment is performed (S103). As shown in a reduction treatment necessity determination flow in FIG. 3, in the determination of a necessity of a reduction treatment in S103, the input gas temperature $T_{IN}$ is determined (S201), and it is determined whether the input gas temperature $T_{IN}$ is higher than the reference temperature T3 ($T_{IN}$>T3) (S202). The reference temperature T3 is a temperature at which CO and HC as exhaust gas components can be sufficiently burned and purified and is set as a temperature at which an oxidation activity rate of the exhaust-gas-purifying catalyst 3 is 50% or more in the present embodiment.

Then, when the input gas temperature $T_{IN}$ is higher than the reference temperature T3 (YES in S202), a reduction treatment necessity flag is set to ON (F=1) (S203). Then, when the input gas temperature $T_{IN}$ is equal to or lower than the reference temperature T3 (NO in S202), the reduction treatment necessity flag is not set to ON, and remains OFF. The process of S203 can be regarded as a process of setting the reduction treatment necessity flag to ON when the input gas temperature $T_{IN}$ of an exhaust gas introduced into the exhaust-gas-purifying catalyst 3 is higher than the reference temperature T3. In addition, the processes of S201 to S203 can be regarded as processes performed by a flag ON setting unit in which the reduction treatment necessity flag is set to ON when the input gas temperature $T_{IN}$ of an exhaust gas introduced into the exhaust-gas-purifying catalyst 3 is higher than the reference temperature T3.

Then, returning to the control flow in FIG. 2, it is determined whether the reduction treatment necessity flag is set to ON (S104), and when it is determined that the reduction treatment necessity flag is set to ON, it is determined that it is necessary to perform the reduction treatment (YES in S104), and the process advances to S105 and subsequent processes. Then, it is determined whether there has been a decrease in the input gas temperature $T_{IN}$ (S105), and it is determined whether the input gas temperature $T_{IN}$ has decreased and reached a temperature lower than an upper limit temperature T2 ($T_{IN}$<T2) (S106). The upper limit temperature T2 is a threshold value of a reduction temperature preset as a temperature of an upper limit in which a reduction effect is obtained when the reduction treatment is performed. The processes of S104 to S106 can be regarded as processes performed by a conditions satisfying determination unit configured to determine whether reduction treatment execution conditions in which the reduction treatment necessity flag has been set to ON and the input gas temperature $T_{IN}$ has decreased and falls within a preset temperature range up to the reference temperature T3 or lower (T1<$T_{IN}$<T2) are satisfied.

Then, when the input gas temperature $T_{IN}$ is a temperature lower than the upper limit temperature ($T_{IN}$<T2) (YES in S106), the reduction treatment is performed (S107). That is, when the reduction treatment necessity flag is ON (F=1) and the input gas temperature $T_{IN}$ is between the lower limit temperature T1 and the upper limit temperature T2, the reduction treatment is performed. The process of S107 can be regarded as a process performed by a reduction treatment performing unit in which, when it is determined by the conditions satisfying determination unit that reduction treatment execution conditions are satisfied, a reduction treatment in which an air-fuel ratio of an intake gas supplied to the engine 2 is adjusted to be richer than the stoichiometric air-fuel ratio is performed. Then, the processes of S104 to S107 can be regarded as a reduction treatment performing process in which, when the reduction treatment necessity flag is ON, and the input gas temperature $T_{IN}$ has decreased and falls within a preset temperature range up to the reference temperature T3 or lower, the air-fuel ratio of an intake gas supplied to the engine 2 is adjusted to be richer than the stoichiometric air-fuel ratio.

In the reduction treatment of S107, the process of adjusting the air-fuel ratio to be richer than the stoichiometric air-fuel ratio is performed. For example, as shown in the reduction treatment control flow in FIG. 4, an additional amount of a fuel is set based on an intake gas amount of the engine 2 and the target A/F (S301). Then, an intake gas is rich-combusted according to the operation of the engine (S302). Then, it is determined whether a duration t of rich combustion is longer than a preset fixed value $t_{Rich}$ (t>$t_{Rich}$) (S303). When the duration t is longer than the fixed value $t_{Rich}$, the duration t of rich combustion is sufficient, and the reduction treatment necessity flag is set to OFF (F=0) (S304). The process of S304 can be regarded as a flag OFF setting unit in which, when a reduction treatment is performed by the reduction treatment performing unit, the reduction treatment necessity flag is set to OFF.

The exhaust gas purifying method using the exhaust-gas-purifying catalyst 3 described above includes a process of setting the reduction treatment necessity flag to ON (F=1) when the input gas temperature $T_{IN}$ of an exhaust gas introduced into the exhaust-gas-purifying catalyst 3 is higher than the reference temperature T3, a process of performing a reduction treatment in which, when the reduction treatment necessity flag is ON (F=1) and the input gas temperature $T_{IN}$ falls within a preset temperature range (between the lower limit temperature T1 and the upper limit temperature T2) lower than the reference temperature T3, an air-fuel ratio of an intake gas supplied to the engine 2 is adjusted to be richer than the stoichiometric air-fuel ratio, and a process of setting the reduction treatment necessity flag to OFF (F=0) after the reduction treatment is performed.

According to the exhaust gas purifying method, when the reduction treatment is performed after the input gas temperature $T_{IN}$ becomes lower than the reference temperature T3, compared to when no reduction treatment is performed, it is possible to improve an oxidation activity rate when the input gas temperature $T_{IN}$ is a low temperature state equal to or lower than the reference temperature T3 and low temperature activation can be achieved.

In particular, in recent years, there has been not only more cold starting of an engine but also more situations in which an engine is stopped according to motor running control or idle stop control of a hybrid vehicle and an exhaust gas temperature decreases. In addition, in order to reduce a $CO_2$ emission amount for the purpose of protecting the environment, an amount of fuel has been reduced, an energy loss due to exhaust heat has been reduced, and further reduction in exhaust gas temperature is proceeding.

In response to such problems, according to the exhaust-gas-purifying system of the present embodiment, when the temperature of an exhaust gas decreases, a reduction treatment is applied for a short time. Therefore, it is possible to prevent a decrease in oxidation activity, it is possible to facilitate activation when the temperature is next raised, and it is possible to obtain high purifying performance with a small amount of PGM.

The exhaust gas purifying method utilizes a phenomenon in which, when a reduction treatment is performed on a catalyst in which the PGM is supported on a $CeO_2$-containing support in predetermined temperature conditions, oxidation activity in low temperature lean conditions is improved.

When used under an oxidizing atmosphere (performing oxidation) with a temperature higher than the reference temperature T3 after the reduction treatment, according to the elapse of time, an activation improvement effect at low temperatures due to the reduction treatment disappears. In addition, also if a reduction treatment is performed at a value equal to or lower than a lower limit temperature T1, an activation improvement effect at low temperatures cannot be obtained. Thus, the principle of this phenomenon is presumed to be that an interaction occurs between the PGM and $CeO_2$, and causes some changes in the state of the PGM.

In addition, also when an oxidation treatment is performed under an atmosphere simulating gas conditions of 600° C. at A/F=25 or also when an oxidation treatment is performed under an atmosphere containing 7% $O_2$ (the remainder being $N_2$), it has been confirmed that an activation improvement effect at low temperatures due to the reduction treatment disappears, and it is considered that this effect disappears when oxygen is in excess at high temperatures. Furthermore, when the reduction treatment is performed thereafter, it has been confirmed that the same effect of improving activation at low temperatures is obtained regardless of differences in oxidation pretreatment.

Next, experimental results of the present embodiment will be described.

<Experiment 1>

Example 1

Here, 9.85 g of $CeO_2$ powder was dispersed in 300 cc of distilled water, and a dinitrodiammine Pt nitrate solution containing a Pt amount of 0.3 g was mixed thereinto with stirring. Subsequently, heating was performed with stirring, and evaporation was performed until moisture disappeared. The obtained powder was calcined in an electric furnace at 500° C. for 2 hours. Here, 9.85 g of $Al_2O_3$ powder was mixed into this powder using a mortar, and Pt/$CeO_2$+$Al_2O_3$ powder with a Pt concentration of 1.5 wt % was obtained. This powder was compacted and molded to prepare a pellet catalyst with a size of 0.5 mm to 1.7 mm.

Figure 6:
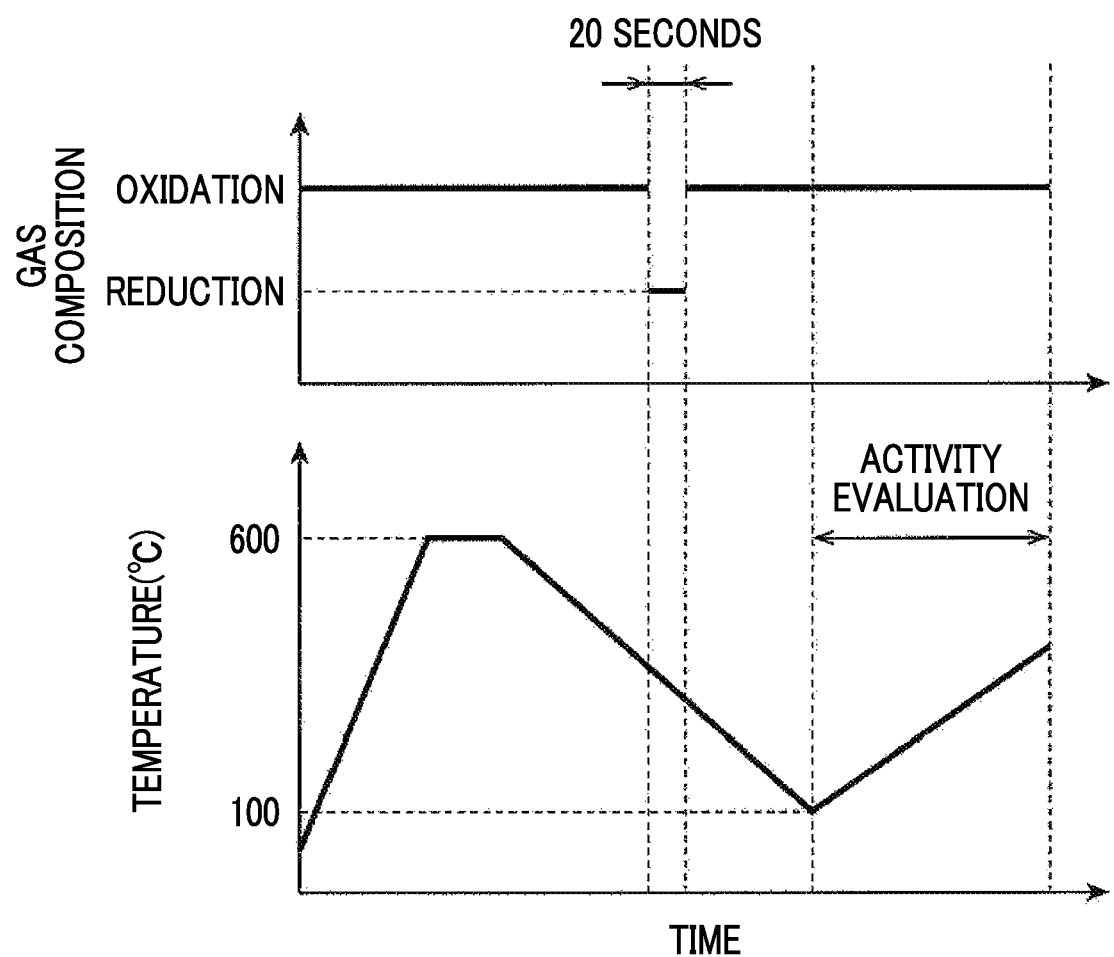
FIG. 6 is a graph showing a change in input gas temperature and a timing of a reduction treatment in Example 1.

FIG. 6 is a graph showing a change in input gas temperature and a timing of a reduction treatment in Example 1. In an oxidizing atmosphere simulating gas conditions when a lean-burn engine was operated at A/F=25, at 200° C. during a process of lowering the temperature (T1 (100° C.)<$T_{IN}$ (200° C.)<T2 (400° C.)) after an oxidation treatment at 600° C. was performed, a reduction treatment (simulating gas conditions at A/F=13.5) was performed for 20 seconds, and oxidation activity of carbon monoxide (CO) and propylene ($C_3H_6$) when the temperature was raised to 400° C. from 100° C. or less at 50° C./min was evaluated. In the present example, the reference temperature T3 and the upper limit temperature T2 were set to 400° C., and the lower limit temperature T1 was set to 100° C.

For evaluation, model gas evaluation was performed. Gas compositions shown in Table 1 were used as gas compositions for evaluation, and a sample amount was 3 g for evaluation.

Table 1 shows gas compositions of a reducing atmosphere and an oxidizing atmosphere.

TABLE 1

| (Remaining $N_2$) | $O_2$ % | NO ppm | CO % | $C_3H_6$ ppm C | $H_2$ % | $CO_2$ % | $H_2O$ % |
|---|---|---|---|---|---|---|---|
| Reduction | 0 | 0 | 3 | 600 | 1 | 10 | 3 |
| Oxidation | 7 | 100 | 0.08 | 4000 | 0 | 10 | 3 |

Comparative Example 1

An oxidation treatment was performed at 600° C. using the catalyst of Example 1. No reduction treatment was performed in the subsequent temperature lowering process, and the same evaluation as in Example 1 was performed after the temperature reached 100° C. or less.

Comparative Example 2

After an oxidation treatment at 600° C. was performed using the catalyst of Example 1, at 100° C. (the lower limit temperature T1) during a process of lowering the temperature, the same evaluation as in Example 1 was performed after a reduction treatment was performed for 20 seconds.

Comparative Example 3

After an oxidation treatment at 600° C. was performed using the catalyst of Example 1, at 400° C. (the upper limit temperature T2) during a process of lowering the temperature, a reduction treatment was performed for 20 seconds, and the same evaluation as in Example 1 was performed after the temperature reached 100° C. or less.

Figure 5:
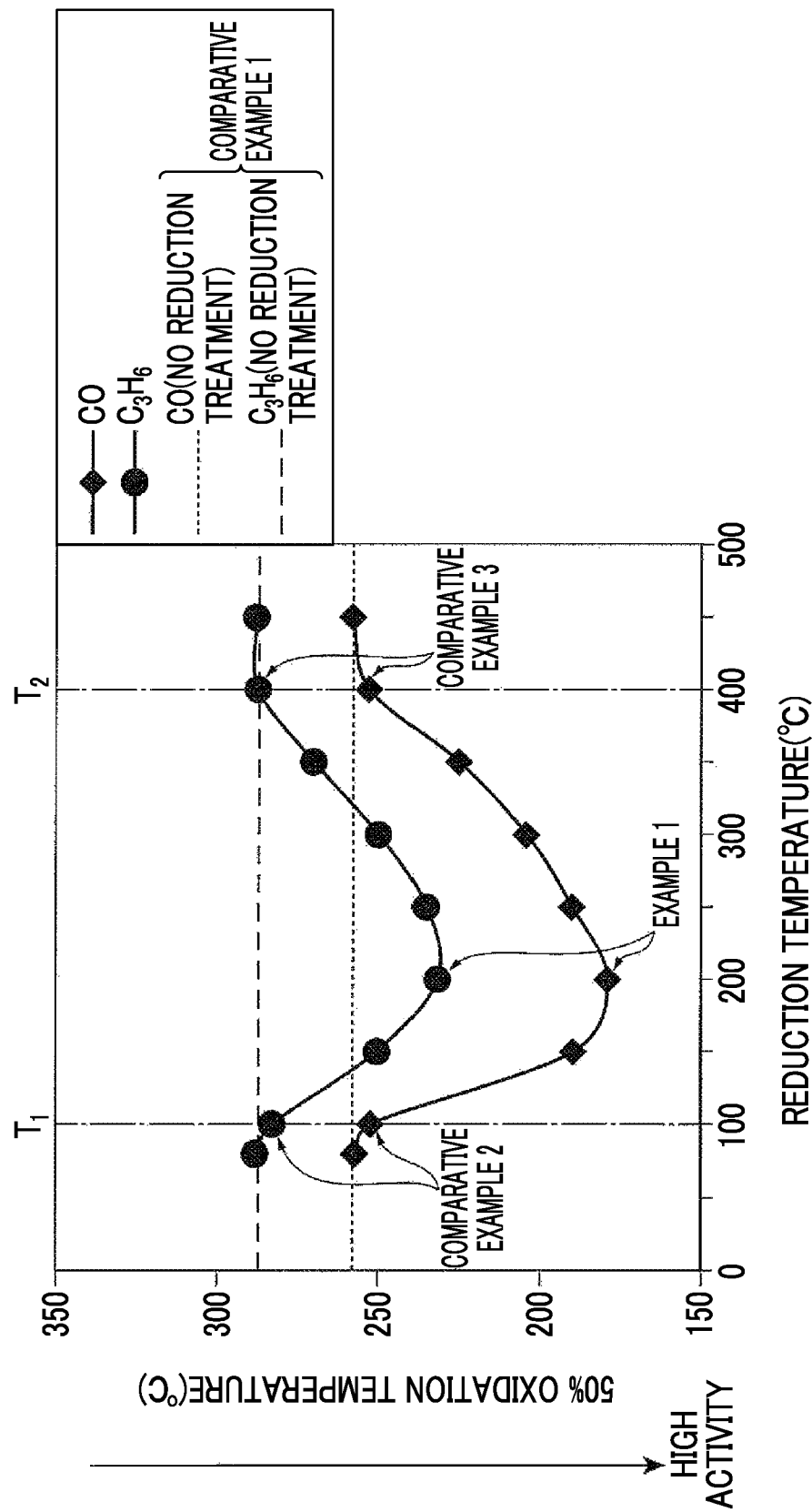
FIG. 5 is a graph showing the relationship between a temperature at which a reduction treatment is performed and an oxidation temperature.

FIG. 5 is a graph showing the relationship between a temperature at which a reduction treatment was performed and an oxidation temperature, and shows plotted results of Experiment 1 shown in Table 2.

In addition to Example 1 and Comparative Examples 1 to 3, additional experiments in which activities when reduction treatments were performed for 20 seconds at 80° C., 150° C., 250° C., 300° C., 350° C., and 450° C. were evaluated were performed. FIG. 5 and Table 2 show results of all experiments.

TABLE 2

| Reduction temperature (° C.) | 50% oxidation temperature (° C.) | | |
|---|---|---|---|
| | CO | $C_3H_6$ | |
| 80 | 257 | 288 | |
| 100 | 252.2 | 282.7 | Comparative Example 2 |
| 150 | 189.6 | 250.3 | |
| 200 | 179 | 231.7 | Example 1 |
| 250 | 190 | 235.2 | |
| 300 | 204.2 | 249.9 | |
| 350 | 225.1 | 269.9 | |
| 400 | 252.8 | 287.3 | Comparative Example 3 |
| 450 | 257.9 | 287.8 | |
| No reduction treatment | 257.8 | 287.1 | Comparative Example 1 |

In Comparative Example 1 in which no reduction treatment was performed, the 50% oxidation temperature indicating the degree of activity was 257.8° C. for carbon monoxide (CO) and 287.1° C. for propylene ($C_3H_6$). In Comparative Example 2 in which a reduction treatment was performed at 100° C. (the lower limit temperature T1), the 50% oxidation temperature was 252.2° C. for carbon monoxide (CO) and 282.7° C. for propylene ($C_3H_6$). In Comparative Example 3 in which a reduction treatment was performed at 400° C. (the upper limit temperature T2), the 50% oxidation temperature was 252.8° C. for carbon monoxide (CO) and 287.3° C. for propylene ($C_3H_6$).

On the other hand, in Example 1 in which a reduction treatment was performed at 200° C., the same 50% oxidation temperature was 179° C. for carbon monoxide (CO) and 231.7° C. for propylene ($C_3H_6$). Therefore, it can be understood that Example 1 had a lower temperature at which the catalyst had oxidation activity and was activated at a lower temperature than Comparative Examples 1 to 3.

Thus, as shown in FIG. 5, it can be understood that, when a reduction treatment was performed in a reduction temperature range (between the lower limit temperature T1 and the upper limit temperature T2), an exhaust-gas-purifying catalyst 3 had oxidation activity at a lower temperature compared to when a reduction treatment was performed at the lower limit temperature T1 or less and when a reduction treatment was performed at the upper limit temperature T2 or more. When a reduction treatment was performed between 100° C. (the lower limit temperature T1) and 400° C. (the upper limit temperature T2), the exhaust-gas-purifying catalyst 3 had oxidation activity that was significantly improved compared to a conventional catalyst in which no reduction treatment was performed.

Experiment 2

Example 2

Here, 19.7 g of $CeO_2$ powder was dispersed in 300 cc of distilled water and a dinitrodiammine Pt nitrate solution containing a Pt amount of 0.3 g was mixed thereinto with stirring. Subsequently, heating was performed with stirring, and evaporation was performed until moisture disappeared. The obtained powder was calcined in an electric furnace at 500° C. for 2 hours, and Pt/$CeO_2$ powder with a Pt concentration of 1.5 wt % was obtained. This powder was compacted and molded to prepare a pellet catalyst with a size of 0.5 mm to 1.7 mm.

Figure 8:
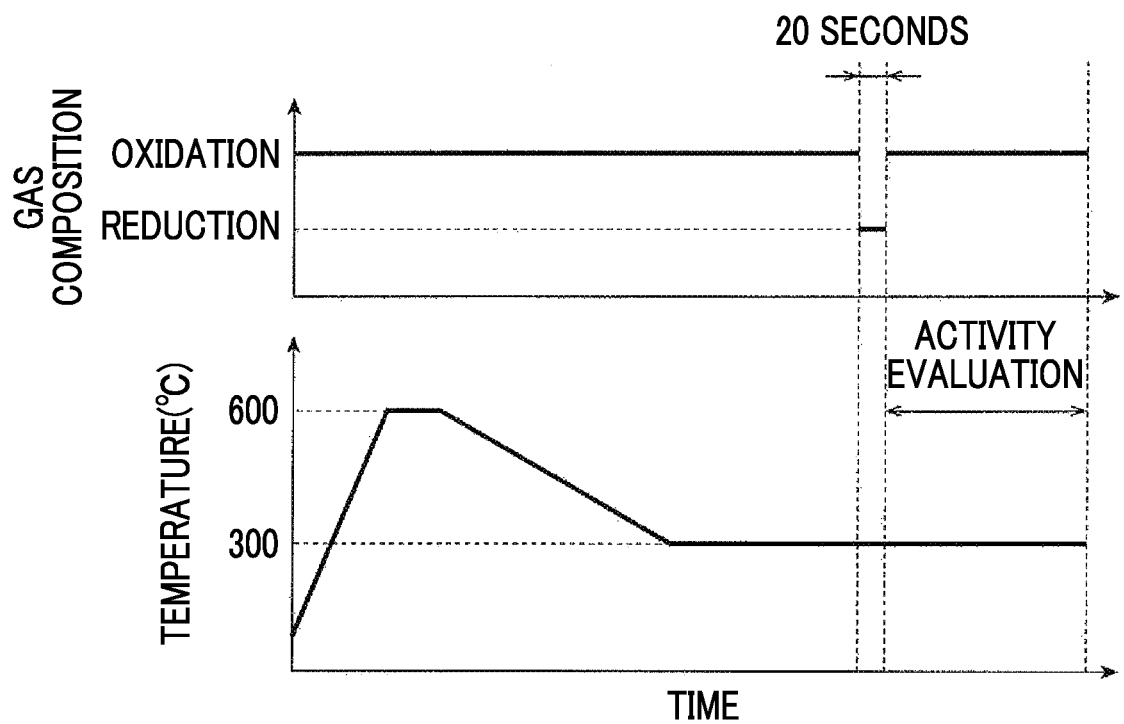
FIG. 8 is a graph showing a change in input gas temperature and a timing of a reduction treatment in Example 2.

FIG. 8 is a graph showing a change in input gas temperature and a timing of a reduction treatment in Example 2. In an oxidizing atmosphere simulating gas conditions when a lean-burn engine was operated at A/F=25, an oxidation treatment at 600° C. was performed and the temperature was then lowered to 300° C. Stabilized oxidation activity after a reduction treatment was performed for 20 seconds was evaluated.

For evaluation, model gas evaluation was performed. Gas compositions shown in Table 3 were used as gas compositions for evaluation, and a sample amount was 1 g for evaluation.

Table 3 shows gas compositions of a reducing atmosphere and an oxidizing atmosphere.

TABLE 3

| (Remaining $N_2$) | $O_2$ % | NO ppm | CO % | $C_3H_6$ ppm C | $C_3H_8$ ppm C | $H_2$ % | $CO_2$ % | $H_2O$ % |
|---|---|---|---|---|---|---|---|---|
| Reduction | 0 | 0 | 3 | 600 | 0 | 1 | 10 | 3 |
| Oxidation | 7 | 100 | 0.08 | 0 | 4000 | 0 | 10 | 3 |

Comparative Example 4

Figure 7:
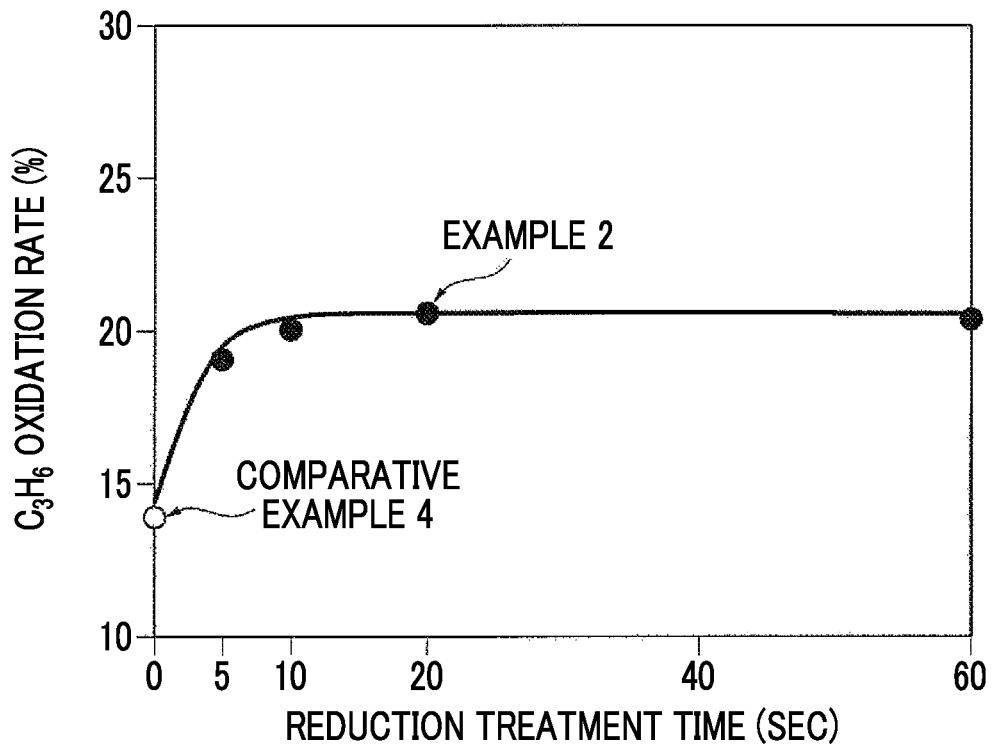
FIG. 7 is a graph showing the relationship between a treatment time length for a reduction treatment and an oxidation rate.

An oxidation treatment at 600° C. was performed using the catalyst of Example 1. After the temperature was lowered to 300° C., oxidation activity was evaluated without performing a reduction treatment. In addition, activities when reduction treatments were performed for 5, 10, 20, and 60 seconds were evaluated. FIG. 7 and Table 4 show results of all experiments.

TABLE 4

| Reduction time (sec) | $C_3H_8$ oxidation rate (%) | |
|---|---|---|
| 0 | 13.9 | Comparative Example 4 |
| 5 | 19 | |
| 10 | 20 | Example 2 |
| 20 | 20.5 | |
| 60 | 20.4 | |

In Comparative Example 4, an oxidation rate of propane ($C_3H_8$) was 13.9%. On the other hand, in Example 2, an oxidation rate of propane ($C_3H_8$) was 20%. Therefore, it can be understood that Example 2 in which a reduction treatment was performed had a higher oxidation rate of propane ($C_3H_8$) and more favorable oxidation activity than Comparative Example 4 in which no reduction treatment was performed.

Experiment 3

Example 3

Here, 19.7 g of $CeO_2$ powder was dispersed in 300 cc of distilled water, and a Pd nitrate solution containing a Pd amount of 0.3 g was mixed thereinto with stirring. Subsequently, heating was performed with stirring, and evaporation was performed until moisture disappeared. The obtained powder was calcined in an electric furnace at 500° C. for 2 hours. Then, Pd/$CeO_2$ powder with a Pd concentration of 1.5 wt % was obtained. This powder was compacted and molded to prepare a pellet catalyst with a size of 0.5 mm to 1.7 mm.

After an oxidation treatment was performed at 600° C., the temperature was lowered to 300° C., and oxidation activity after a reduction treatment was performed for 20 seconds was evaluated.

Example 4

Here, 19.7 g of $CeO_2$ powder was dispersed in 300 cc of distilled water, and a Rh nitrate solution containing a Rh amount of 0.3 g was mixed thereinto with stirring. Subsequently, heating was performed with stirring, and evaporation was performed until moisture disappeared. The obtained powder was calcined in an electric furnace at 500° C. for 2 hours and Rh/$CeO_2$ powder with a Rh concentration of 1.5 wt % was obtained. This powder was compacted and molded to prepare a pellet catalyst with a size of 0.5 mm to 1.7 mm.

After an oxidation treatment was performed at 600° C., the temperature was lowered to 300° C., and oxidation activity after a reduction treatment was performed for 20 seconds was evaluated.

Example 5

After an oxidation treatment was performed at 600° C. using the catalyst of Example 2, the temperature was lowered to 300° C., and oxidation activity after a reduction treatment was performed for 20 seconds was evaluated.

Example 6

Here, 19.4 g of $CeO_2$ powder was dispersed in 300 cc of distilled water, and a Pt nitrate solution containing a Pt amount of 0.6 g was mixed thereinto with stirring. Subsequently, heating was performed with stirring, and evaporation was performed until moisture disappeared. The obtained powder was calcined in an electric furnace at 500° C. for 2 hours, and Pt/$CeO_2$ powder with a Pt concentration of 3.0 wt % was obtained. This powder was compacted and molded to prepare a pellet catalyst with a size of 0.5 mm to 1.7 mm.

After an oxidation treatment was performed at 600° C., the temperature was lowered to 300° C., and oxidation activity after a reduction treatment was performed for 20 seconds was evaluated.

Example 7

Here, 19.0 g of $CeO_2$ powder was dispersed in 300 cc of distilled water, and a Pt nitrate solution containing a Rh amount of 1.0 g was mixed thereinto with stirring. Subsequently, heating was performed with stirring, and evaporation was performed until moisture disappeared. The obtained powder was calcined in an electric furnace at 500° C. for 2 hours, and $Pt/CeO_2$ powder with a Pt concentration of 5.0 wt % was obtained. This powder was compacted and molded to prepare a pellet catalyst with a size of 0.5 mm to 1.7 mm.

After an oxidation treatment was performed at 600° C., the temperature was lowered to 300° C., and oxidation activity after a reduction treatment was performed for 20 seconds was evaluated.

Comparative Example 5

An oxidation treatment was performed at 600° C. using the catalyst of Example 3, and after the temperature was lowered to 300° C., oxidation activity was evaluated without a reduction treatment.

Comparative Example 6

An oxidation treatment was performed at 600° C. using the catalyst of Example 4, and after the temperature was lowered to 300° C., oxidation activity was evaluated without a reduction treatment.

Comparative Example 7

An oxidation treatment was performed at 600° C. using the catalyst of Example 2, and after the temperature was lowered to 300° C., oxidation activity was evaluated without a reduction treatment.

Comparative Example 8

An oxidation treatment was performed at 600° C. using the catalyst of Example 6, and after the temperature was lowered to 300° C., oxidation activity was evaluated without a reduction treatment.

Comparative Example 9

An oxidation treatment was performed at 600° C. using the catalyst of Example 7, and after the temperature was lowered to 300° C., oxidation activity was evaluated without a reduction treatment.

For evaluation, model gas evaluation was performed. Gas compositions shown in Table 2 were used as gas compositions for evaluation, and a sample amount was 3 g for evaluation.

Figure 9:
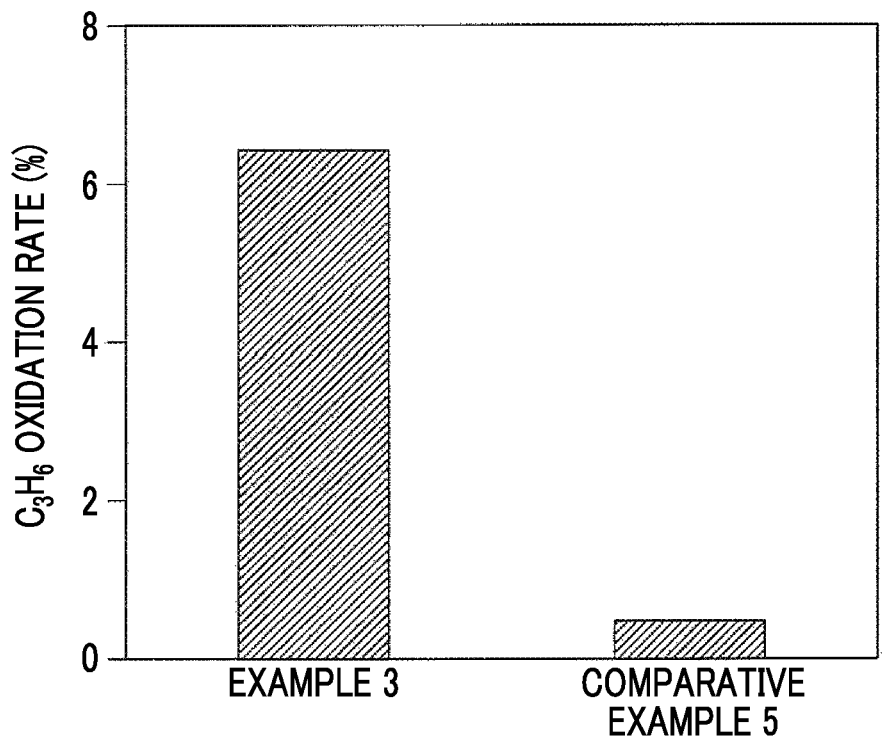
FIG. 9 is a graph showing oxidation rates of Example 3 and Comparative Example 5.

FIG. 9 is a graph showing oxidation rates of Example 3 and Comparative Example 5 and shows experimental results shown in Table 5 as a graph.

TABLE 5

|  | $C_3H_8$ oxidation rate (%) |
| --- | --- |
| Example 3 | 6.42 |
| Comparative Example 5 | 0.48 |

Example 3 and Comparative Example 5 were different according to whether a reduction treatment was performed. In Example 3, an oxidation rate of propane $(C_3H_8)$ was 6.42%. On the other hand, in Comparative Example 5, an oxidation rate of propane $(C_3H_8)$ was 0.48%. Therefore, it can be understood that Example 3 in which a reduction treatment was performed had a higher oxidation rate of propane $(C_3H_8)$ and more favorable oxidation activity than Comparative Example 5 in which no reduction treatment was performed.

Figure 10:
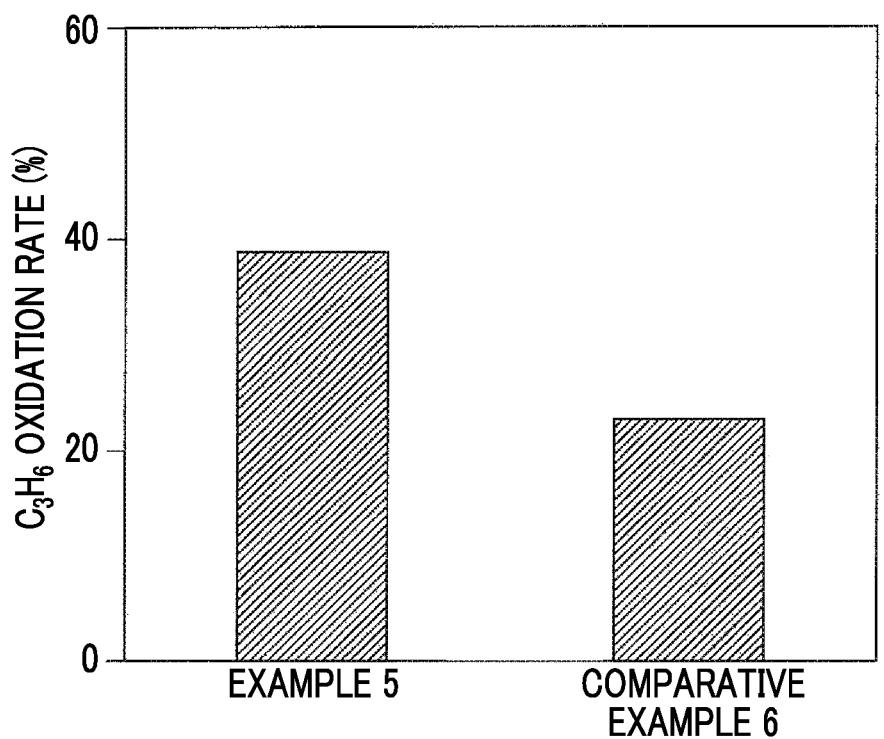
FIG. 10 is a graph showing oxidation rates of Example 4 and Comparative Example 6.

FIG. 10 is a graph showing oxidation rates of Example 4 and Comparative Example 6 and shows experimental results shown in Table 6 as a graph.

TABLE 6

|  | $C_3H_8$ oxidation rate (%) |
| --- | --- |
| Example 4 | 38.74 |
| Comparative Example 6 | 22.96 |

Example 4 and Comparative Example 6 were different according to whether a reduction treatment was performed. In Example 4, an oxidation rate of propane $(C_3H_8)$ was 38.74%. On the other hand, in Comparative Example 6, an oxidation rate of propane $(C_3H_8)$ was 22.96%. Therefore, it can be understood that Example 4 in which a reduction treatment was performed had a higher oxidation rate of propane $(C_3H_8)$ and more favorable oxidation activity than Comparative Example 6 in which no reduction treatment was performed.

Figure 11:
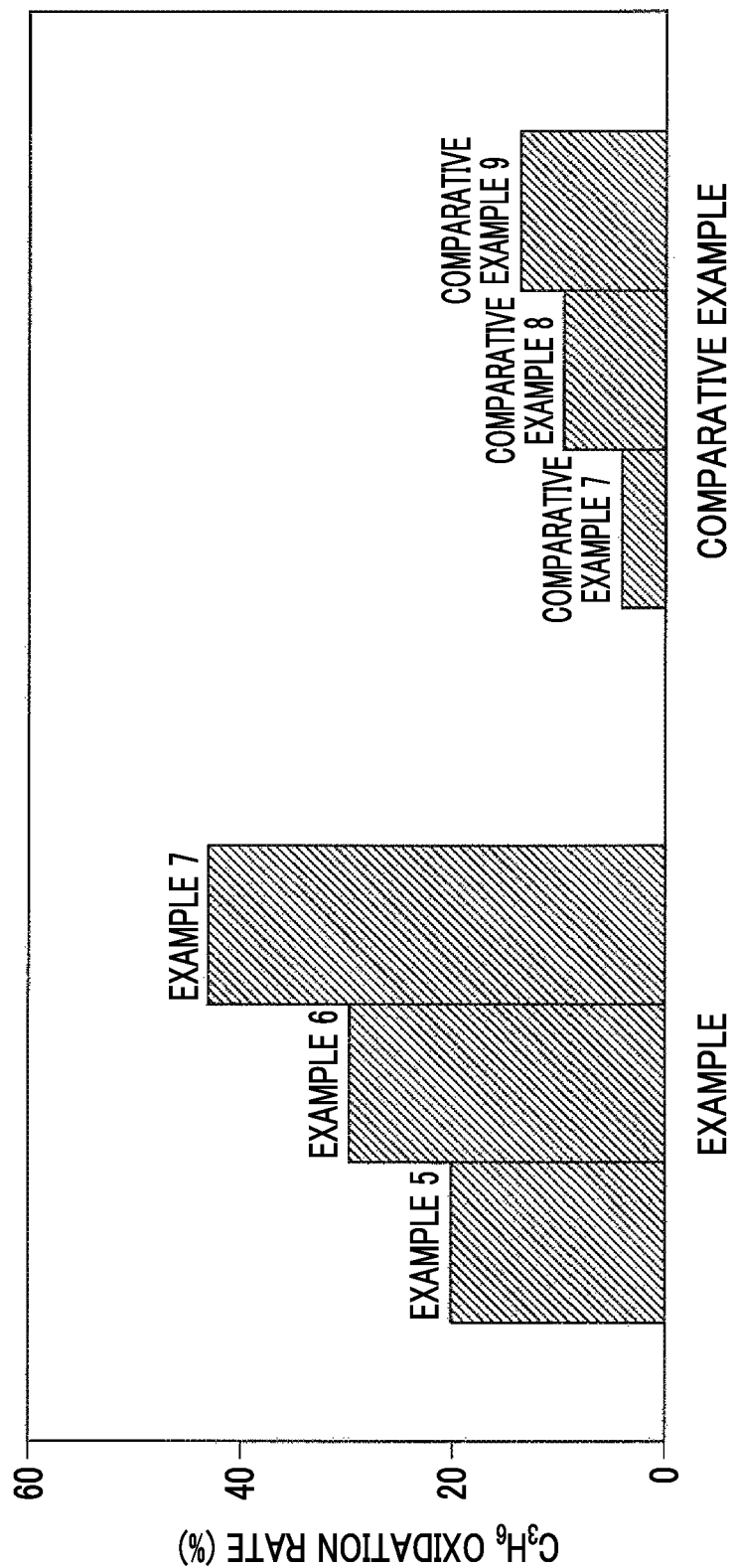
FIG. 11 is a graph showing oxidation rates of Examples 5 to 7 and Comparative Examples 7 to 9.

FIG. 11 is a graph showing oxidation rates of Examples 5 to 7 and Comparative Examples 7 to 9 and shows experimental results shown in Table 7 as a graph.

TABLE 7

|  | $C_3H_8$ oxidation rate (%) |
| --- | --- |
| Example 5 | 20.09 |
| Example 6 | 29.79 |
| Example 7 | 43.12 |
| Comparative Example 7 | 4.13 |
| Comparative Example 8 | 9.55 |
| Comparative Example 9 | 13.64 |

The difference between Example 5 and Comparative Example 7, the difference between Example 6 and Comparative Example 8, and the difference between Example 7 and Comparative Example 9 were whether a reduction treatment was performed or not. In Example 5, an oxidation rate of propane $(C_3H_8)$ was 20.09%. On the other hand, in Comparative Example 7, an oxidation rate of propane $(C_3H_8)$ was 4.13%. In Example 6, an oxidation rate of propane $(C_3H_8)$ was 29.79%. On the other hand, in Comparative Example 8, an oxidation rate of propane $(C_3H_8)$ was 9.55%. In Example 7, an oxidation rate of propane $(C_3H_8)$ was 43.12%. On the other hand, in Comparative Example 9, an oxidation rate of propane $(C_3H_8)$ was 13.64%.

Therefore, it can be understood that Examples 5, 6, and 7 in which a reduction treatment was performed had a higher oxidation rate of propane $(C_3H_8)$ and more favorable oxidation activity than Comparative Examples 7, 8, and 9 in which no reduction treatment was performed.

While the embodiments of the present disclosure have been described above in detail, the present disclosure is not limited to the embodiments, and various design modifications can be made. For example, while an example in which the reference temperature T3 and the upper limit temperature T2 are set to the same temperature (400° C.) has been described in the experiments described above, the reference temperature T3 may be set to be higher than the upper limit temperature T2.

What is claimed is:

1. An exhaust-gas-purifying system of an internal combustion engine, comprising:
   an exhaust-gas-purifying catalyst in which at least one of Rh, Pd, and Pt is supported on a $CeO_2$-containing support; and
   an electronic control unit including:
      a flag ON setting unit configured to set a reduction treatment necessity flag to ON when an input gas temperature which is a temperature of an exhaust gas introduced into the exhaust-gas-purifying catalyst is higher than a reference temperature;
      a conditions satisfying determination unit configured to determine whether reduction treatment execution conditions in which the reduction treatment necessity flag has been set to ON by the flag ON setting unit and the input gas temperature has decreased and falls within a preset temperature range up to the reference temperature or lower are satisfied;
      a reduction treatment performing unit configured to perform a reduction treatment in which an air-fuel ratio of an intake gas supplied to the internal combustion engine is adjusted to be richer than a stoichiometric air-fuel ratio when the conditions satisfying determination unit determines that the reduction treatment execution conditions are satisfied; and
      a flag OFF setting unit configured to set the reduction treatment necessity flag to OFF when the reduction treatment is performed by the reduction treatment performing unit.

2. A method of using an exhaust-gas-purifying catalyst in which at least one of Rh, Pd, and Pt is supported on a $CeO_2$-containing support, and an electronic control unit, wherein the electronic control unit includes: a flag ON setting unit, a reduction treatment performing unit, and a flag OFF setting unit, the method comprising:
   a process of setting a reduction treatment necessity flag to ON, using the flag ON setting unit, when an input gas temperature which is a temperature of an exhaust gas introduced into the exhaust-gas-purifying catalyst is higher than a reference temperature;
   a process of performing a reduction treatment, using the reduction treatment performing unit, in which an air-fuel ratio of an intake gas supplied to an internal combustion engine is adjusted to be richer than a stoichiometric air-fuel ratio when the reduction treatment necessity flag is set to ON and the input gas temperature decreases and falls within a preset temperature range up to the reference temperature or lower; and
   a process of setting the reduction treatment necessity flag to OFF, using the flag OFF setting unit, after the reduction treatment is performed.

3. An exhaust-gas-purifying system of an internal combustion engine, the system comprising;
   an exhaust-gas-purifying catalyst having a configuration in which at least one of Rh, Pd, and Pt is supported on a $CeO_2$-containing support; and
   an electronic control unit programmed to:
      set a reduction treatment necessity flag to ON when an input gas temperature which is a temperature of an exhaust gas introduced into the exhaust-gas-purifying catalyst is higher than a reference temperature;
      determine whether reduction treatment execution conditions in which the reduction treatment necessity flag has been set to ON and the input gas temperature has decreased and falls within a preset temperature range up to the reference temperature or lower are satisfied;
      perform a reduction treatment in which an air-fuel ratio of an intake gas supplied to the internal combustion engine is adjusted to be richer than a stoichiometric air-fuel ratio when it is determined that the reduction treatment execution conditions are satisfied; and
      set the reduction treatment necessity flag to OFF when the reduction treatment is performed.

4. A method of controlling an air-fuel ratio in an exhaust-gas-purifying system of an internal combustion engine including an exhaust-gas-purifying catalyst in which at least one of Rh, Pd, and Pt is supported on a $CeO_2$-containing support, and an electronic control unit, wherein the electronic control unit includes: a flag ON setting unit, a reduction treatment performing unit, and a flag OFF setting unit, the method comprising:
   setting a reduction treatment necessity flag to ON, using the flag ON setting unit, when an input gas temperature which is a temperature of an exhaust gas introduced into the exhaust-gas-purifying catalyst is higher than a reference temperature;
   performing a reduction treatment, using the reduction treatment performing unit, in which an air-fuel ratio of an intake gas supplied to an internal combustion engine is adjusted to be richer than a stoichiometric air-fuel ratio when the reduction treatment necessity flag is set to ON and the input gas temperature decreases and falls within a preset temperature range up to the reference temperature or lower; and
   setting the reduction treatment necessity flag to OFF, using the flag OFF setting unit, after the reduction treatment is performed.

5. The method of controlling an air-fuel ratio according to claim 4, wherein the reference temperature is 400° C.

* * * * *